Patented Nov. 8, 1927.

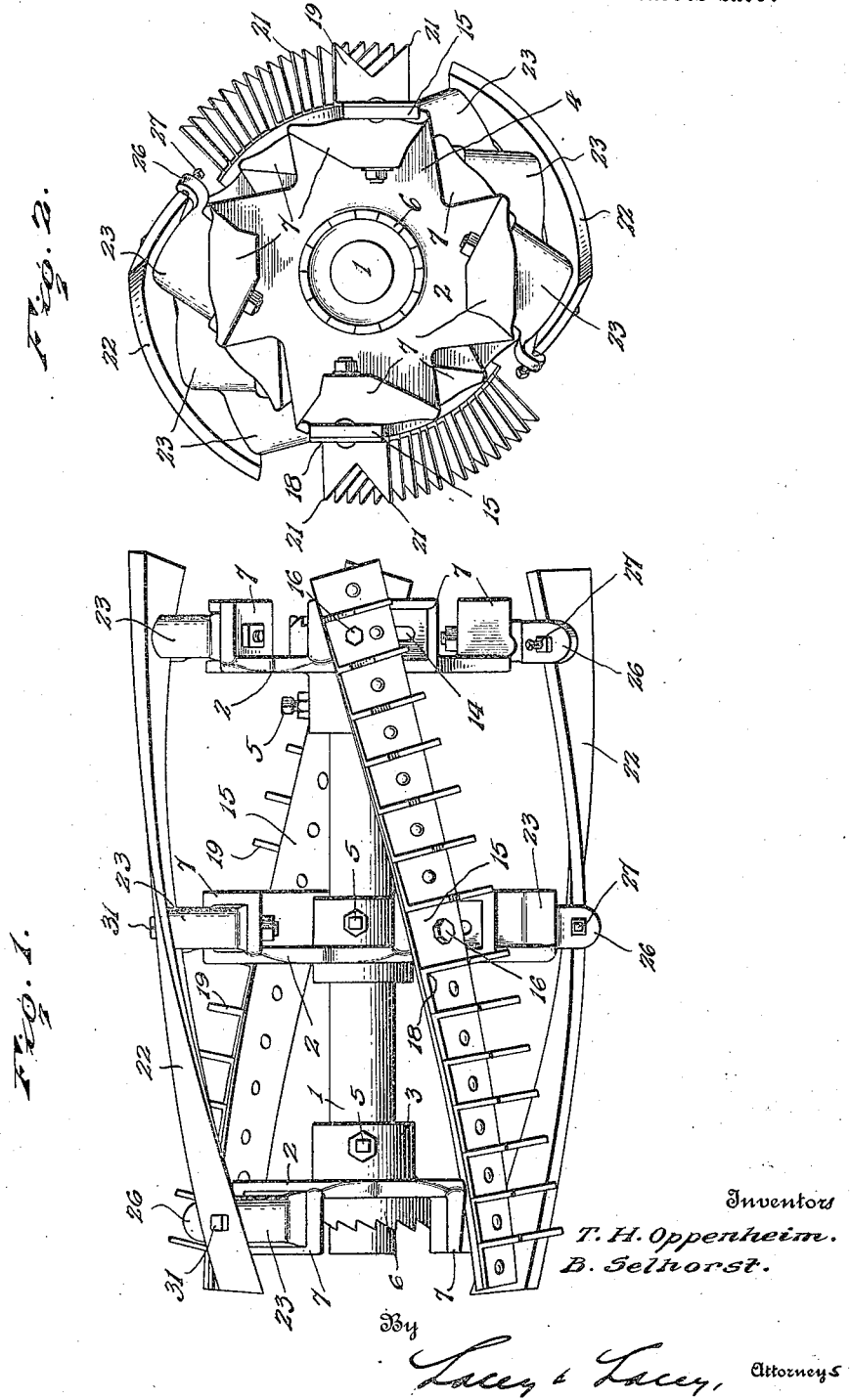

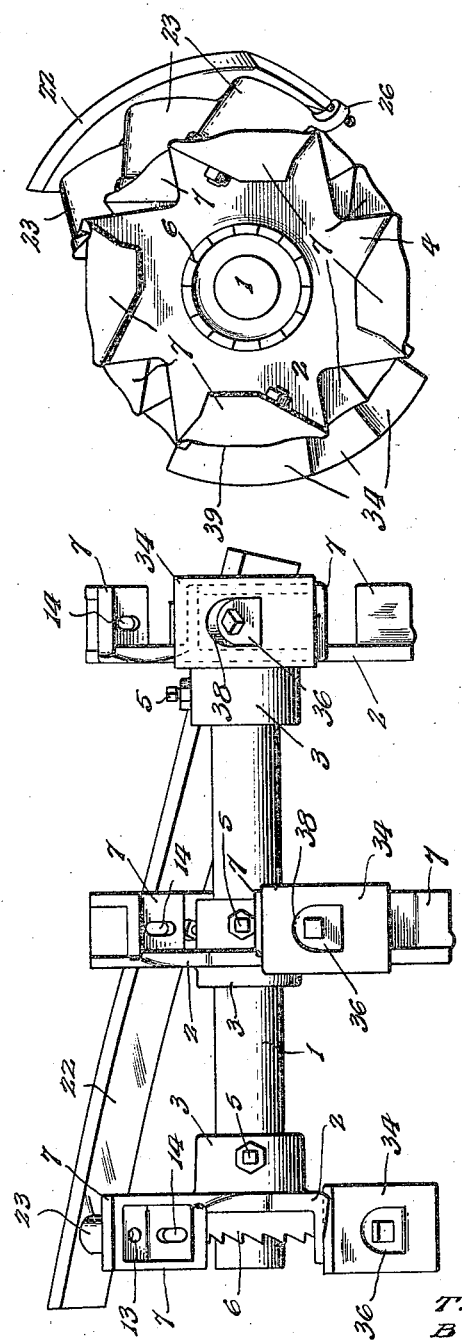

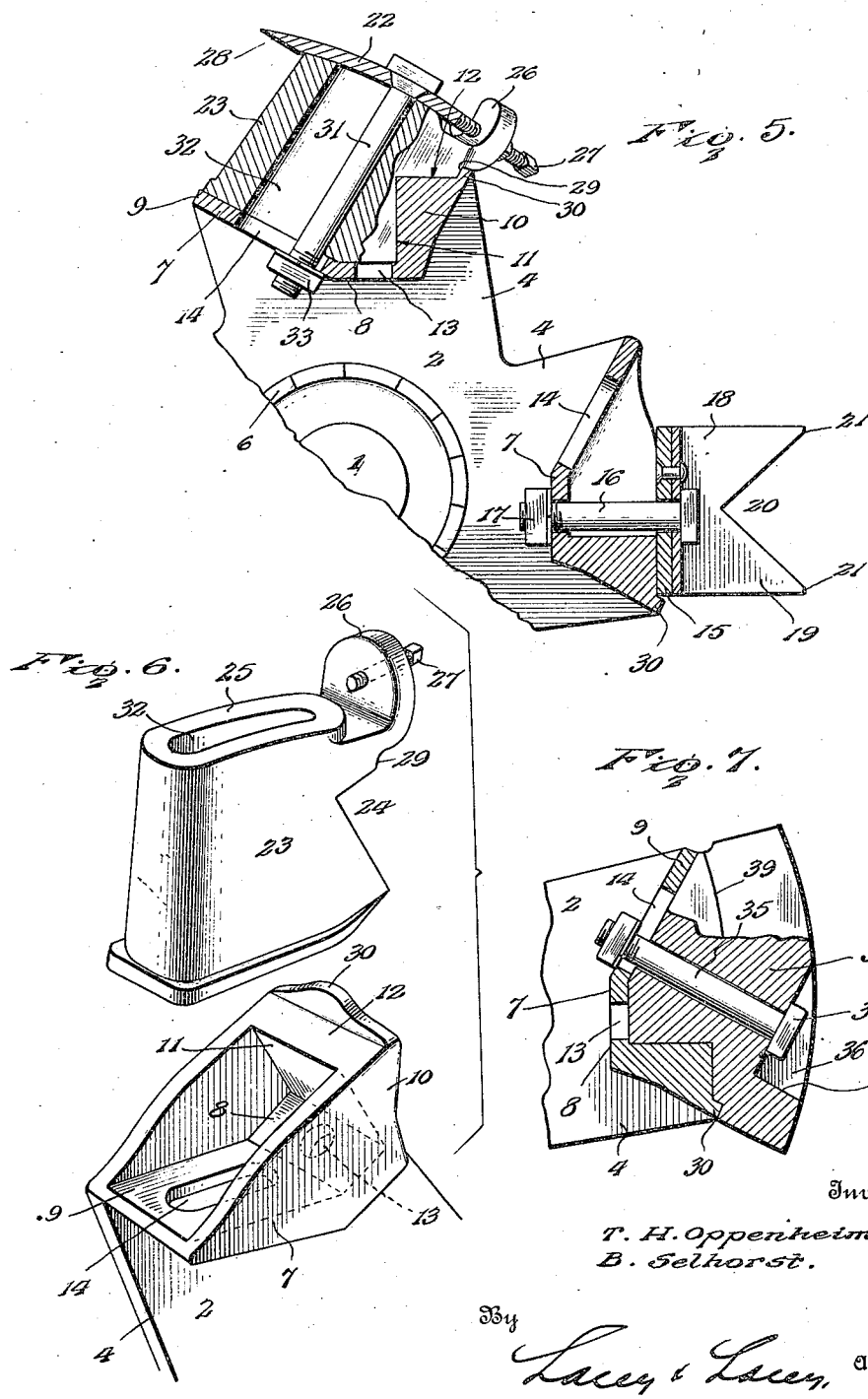

1,648,422

UNITED STATES PATENT OFFICE.

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO.

CUTTER HEAD.

Application filed August 26, 1926. Serial No. 131,688.

Our present invention relates to cutter heads for corn huskers, corn shredders, ensilage cutters and similar machines, and has for its object the provision of a cutter head in which knives or shredder bars may be employed at will interchangeably or simultaneously and in any desired combination. The invention has for an object the provision of a novel construction whereby the knives may be adjusted to compensate for wear without changing the radius of the arc described by the cutting edge, and another object of the invention is to provide a cutter head in which cutters and shredder bars may be used together and will be so mounted that the radius of the cutting edges of the bars and the knives will be equal, and a further object of the invention is to provide a construction which will facilitate the adjustment of the parts and will very effectually withstand the strains imposed upon the cutter head in operation. The invention is illustrated in the accompanying drawings and will be hereinafter fully set forth.

In the drawings:

Figure 1 is a side elevation of a cutter head embodying our present invention and showing the same equipped with both shredder bars and knives;

Fig. 2 is an end elevation of the cutter head shown in Fig. 1;

Fig. 3 is a view similar to Fig. 1 but showing the cutter head equipped with a single knife and with counter-balance weights;

Fig. 4 is an end elevation of the arrangement shown in Fig. 3;

Fig 5 is an enlarged detail sectional elevation of a portion of one head showing more particularly the manner of securing the knives and the shredder bars in place;

Fig 6 is a detail perspective view of the filler block employed for mounting the knives and also showing the socket which receives the filler block; and Fig. 7 is a detail section showing the manner of securing a counterbalance weight in place.

In carrying out the invention, we employ a shaft 1 which is mounted in suitable bearings in the machine frame and, when employed in our machine, is disposed near one end of the frame so that it is accessible without requiring removal when repairs or adjustments are needed. Secured upon the shaft 1 are three heads 2 which are disposed near the respective ends and the center of the shaft respectively. These heads each comprise a hub 3 and a disk forming spokes 4, the hubs being fitted around the shaft and secured thereto by set screws 5 in an obvious manner, while one of the end heads is provided with notches or saw teeth 6 which act to tear any twine or strings which start to wrap around the bearings.

On one side face of each head or disk and at the outer end of each spoke 4, we form a rest or lug 7 which is hollow and has its bottom or innermost wall formed with a portion 8 at a right angle to a radius passing centrally through the lug and the remaining portion 9 disposed at an angle to said radius and converging toward the end of the spoke and the outer side of the lug. At the end of the lug remote from the bottom portion 9 is a substantial wall 10 having its inner side 11 straight and parallel with the radius passing centrally through the lug, the outer surface 12 of the said wall 10 being straight and at a right angle to the surface 11 and the outer edges of the side walls of the lug being flush with and forming extensions of the surface 12, as shown in Figs. 5 and 6. Through the portion 8 of the bottom wall of the lug is an opening 13 and through the portion 9 is a slot 14. When a shredder bar is to be attached to the cutter head, the base bar 15 thereof is placed against the several heads so as to rest directly on the flat surface 12 of the corresponding lugs, and it may be noted at this point that the lugs and spokes of the several heads are so arranged relatively to each other that the knives and shredder bars when in place will be spirally disposed, as shown clearly in Fig. 1. After the base bar 15 of the shredder has been brought into proper position upon the several heads and lugs 7, a bolt 16 is inserted through an opening provided therefor in the shredder bar and through the opening 13 in the respective lug, a retaining nut 17 being fitted upon the inner end of the bolt to bear against the inner surface of the bottom wall of the lug, as shown clearly in Fig. 5. As has been stated, the parts are accessible from the end of the machine frame when the cutter head is in use so that, if repair or renewal of a shredder bar of a knife is necessary, a socket wrench may be engaged over the head of the bolt 16 and the bolt rotated so as to free the bar without requiring the cutter head to be removed from the machine. Of course, when first assembling the cutter head, the entire head may be assembled before it is placed upon the shaft 1 and mounted in the machine. The shredders consist each of a flat bar 15 given a proper twist or spiral formation and angle brackets 18 secured upon the outer surface of the bar in abutting relation, as shown in Fig. 1, the outstanding web or member 19 of each bracket being notched, as shown at 20, Fig. 5, whereby a pair of teeth 21 are produced. When so desired, the brackets 18 may be so disposed upon alternate bars that the shredding teeth will be pronouncedly staggered, but it will be noted upon reference to Fig. 1 that the inclination assumed by the teeth through the spiral disposition of the shredder bars imparts a somewhat staggered relation thereto.

When the knives, indicated at 22, are to be mounted upon the heads, filler blocks 23 are employed. These filler blocks are so shaped that they will fit snugly within the respective lugs 7 and abut flatly against the outer surface of the bottom member thereof. In one end of each filler block is a right-angle recess 24 which accommodates the surfaces 11 and 12 of the lug and enables the filler block to rest squarely on and against said surfaces, as shown in Fig. 5. The outer end surface of each filler block is arcuate, as shown at 25, so that a firm bearing and support for the blade is provided and at the recessed end of the block a lip 26 rises therefrom to carry a set screw 27, the said set screw being adapted to bear against the back edge of the knife blade so that adjustment of the blade to compensate for wear may be very easily accomplished. It will be noted also that the bevel of the cutting edge of the blade is on the inner or under side, as shown at 28, this arrangement serving to maintain the cutting edge so that grinding of the blade will be very seldom required. It will also be noted upon reference to Fig. 5 that a shoulder 29 is formed upon the filler block at the base of the lip 26 and a cooperating stop lip 30 is provided upon the wall of the lug so that the thrust against the knives will be very effectually taken up. It will also be noted that this stop lip 30 is engaged by the back edge of the shredder bar when said bar is in place, so that the thrust against the shredder bar is likewise taken up, the strain upon the securing bolt being correspondingly reduced. The knife blade is secured upon the filler block by a bolt 31 inserted through an opening provided therefor in the blade and through a longitudinal slot 32 provided in the filler block, the inner end of the bolt passing through the slot 14 in the lug and being equipped with a nut 33 corresponding in its function and method of manipulation to the nut 17 previously mentioned. It will be noted that the angle of the portion 9 of the bottom wall of the lug is such that the clamping action of the bolt 31 and the nut 33 is exactly at a right angle thereto as well as at a right angle to the knife at the point where the bolt engages the knife so that the knife will be very securely clamped to the filler block and to the head. It is also to be noted that the slots 14 and 32 permit the bolt 31 to move outwardly with respect to the head and the block while at the same time retaining its lateral relation thereto and, consequently, the blade may be very easily adjusted inasmuch as it is necessary merely to slightly loosen the bolt 31 and then properly manipulate the set screw 27. A socket wrench may be engaged with the head of the bolt and rotated to slightly loosen it, the nut being held against the bottom wall of the socket with sufficient friction to remain in place. It is further to be noted that the slight curve or arcuate formation of the end of the filler block permits the knife to maintain its radial relation to the other parts in all positions of its adjustment through the action of the set bolt 27 and a firm seat for the knife is provided at all times.

In the actual use of corn-husking and shredding machines, various conditions have to be met. Some farmers desire their corn stalks or fodder to be cut into comparatively long pieces, while others prefer it cut into very short pieces and others prefer to have it merely shredded into strings and still others desire it to be cut into relatively short lengths and also shredded. In Figs. 1 and 2, we have shown the head equipped with two diametrically opposite shredder bars and alternately with two diametrically opposite knives so that the fodder is not only shredded but is also cut. If it be desired to merely cut the fodder into pieces of average length, the shredder bars, shown in Figs. 1 and 2, may be removed and the two diametrically opposite knives employed. If it be desired to cut the stalks into very short pieces, four knives may be employed, two knives being substituted for the shredder bars shown in Figs. 1 and 2, and, of course, if so desired, all the knives may be removed and shredder bars substituted therefor. If it be desired to cut the stalks into comparatively long strips without shredding them, a single knife may be employed, as shown in Figs. 3 and 4. When a single knife is employed, it is of course, advisable to provide some means of counter-balancing the weight of the knife and the filler blocks upon which it is mounted, and for this purpose we provide the counter-balance blocks 34. These blocks 34 are castings having their inner portions shaped to conform closely to the interior of a lug 7 so that they may fit snugly therein and be secured by bolts 35 inserted through openings provided therefor, in the counter-balance blocks and through the slots 14, as shown in Fig. 7. In the outer surface of each counter-balance block is formed a recess 36 to accommodate the head 37 of the bolt 35 so that the head will not project beyond the outer face of the block and will, moreover, rest against a flat surface so that a proper firm fastening of the weight may be effected. As shown in Fig. 3, the end wall 38 of the recess 36 is arcuate to accommodate a wrench head when it is desired to remove the counter-balance without removing the cutter head from the machine. It is also to be noted that the edge portions of the counter-weight are properly formed to project over and rest upon the outer surfaces of the respective lugs, as shown at 39.

Our improved construction of cutter head facilitates the assembling of the parts so that the head can be very expeditiously assembled in any desired combination of cutting or shredding elements and the adjustment may be very easily and rapidly changed if desired. Moreover, the parts are so constructed and arranged that the shredder bars or knives are very firmly secured in place with minimum strain upon the securing bolts so that the cutter head will stand up without breakage under very severe usage and will operate successfully for a long period under normal working conditions.

Having thus described the invention, we claim:

1. A cutter head for corn huskers and similar machines comprising disks provided at their peripheries with spaced hollow lugs, said lugs having rear walls provided with flat outer surfaces and having bottoms of angular formation, the portion of the bottom immediately adjacent the rear wall being perpendicular to said wall and the remaining portion of the bottom extending obliquely toward the front outer corner of the lug.

2. Cutting mechanism comprising disks provided peripherally with spaced hollow lugs each having its outer side open through the greater portion of its area and formed with a supporting surface at the rear of the open portion, a stop lip at the rear of said open portion, elements to rest against the rear supporting surfaces of the lugs and abut the stop lips, and means inserted through the said elements and the lugs for securing the said elements in place.

3. Cutting mechanism comprising disks provided at their peripheries with spaced hollow lugs each formed at one end with intersecting flat surfaces and having their bottom walls disposed in angular formation, the greater portion of the bottom wall being provided with a longitudinal slot, filler blocks engageable in the respective lugs and each having an angularly recessed end to fit against the intersecting flat surfaces of the end of the lug and provided with a longitudinal slot alining with the longitudinal slot in the bottom wall of the lug, a knife resting across the outer walls of the filler blocks, and securing bolts engaged through the knife and passing through the said several slots and equipped at their inner ends with retaining nuts.

4. Cutting mechanism comprising disks provided peripherally with hollow lugs, filler blocks fitting in the lugs and held against rotation thereby, the lugs and the filler blocks being provided with alining longitudinal slots and the filler blocks being provided each at one end with an outwardly extending lip, a knife resting across the several filler blocks, bolts engaged through the knife and through the longitudinal slots of the filler blocks and the lugs, and set bolts mounted in the said lips and bearing against the back edge of the knife.

5. Cutting mechanism comprising disks provided peripherally with hollow lugs each having a stop lip at its rear side, blocks filling the respective lugs and held against rotation thereby and each provided at its rear side with a shoulder bearing against the respective adjacent stop lip, and means for securing the blocks within the lugs.

In testimony whereof we affix our signatures.

THEODORE H. OPPENHEIM. [L. S.]
BERNARD SELHORST. [L. S.]